US012587723B1

(12) United States Patent　　　　(10) Patent No.:　US 12,587,723 B1
Malli　　　　　　　　　　　　　　　　(45) Date of Patent:　　Mar. 24, 2026

(54) VIDEO CREATION SYSTEM FOR MASS PRODUCTION AND DISTRIBUTION OF CUSTOM VIDEOS

(71) Applicant: David Malli, Pittsburgh, PA (US)

(72) Inventor: David Malli, Pittsburgh, PA (US)

( * ) Notice: Subject to any disclaimer, the term of this patent is extended or adjusted under 35 U.S.C. 154(b) by 0 days.

(21) Appl. No.: 18/429,537

(22) Filed: Feb. 1, 2024

Related U.S. Application Data

(60) Provisional application No. 63/442,784, filed on Feb. 2, 2023.

(51) Int. Cl.
| | |
|---|---|
| *H04N 7/173* | (2011.01) |
| *G11B 27/031* | (2006.01) |
| *H04N 21/231* | (2011.01) |
| *H04N 21/854* | (2011.01) |
| *H04N 21/858* | (2011.01) |

(52) U.S. Cl.
CPC ......... *H04N 21/854* (2013.01); *G11B 27/031* (2013.01); *H04N 21/231* (2013.01); *H04N 21/8586* (2013.01)

(58) Field of Classification Search
CPC .............. H04N 21/854; H04N 21/231; H04N 21/8586; G11B 27/031
USPC ....................................................... 725/115
See application file for complete search history.

(56) References Cited

U.S. PATENT DOCUMENTS

| | | | | |
|---|---|---|---|---|
| 7,352,952 | B2 * | 4/2008 | Herberger ............ | G11B 27/031 386/285 |
| 9,032,297 | B2 | 5/2015 | Lovejoy et al. | |

| | | | | |
|---|---|---|---|---|
| 9,161,007 | B2 * | 10/2015 | Suri .......................... | H04N 9/80 |
| 9,477,380 | B2 | 10/2016 | Amijee | |
| 10,643,221 | B1 * | 5/2020 | Price ...................... | G06Q 30/02 |
| 11,152,031 | B1 * | 10/2021 | Chen ....................... | G11B 27/10 |
| 2003/0191816 | A1 | 10/2003 | Landress et al. | |
| 2007/0260984 | A1 * | 11/2007 | Marks ..................... | A63F 13/65 715/706 |
| 2007/0300250 | A1 * | 12/2007 | Smith .................. | H04N 21/458 725/135 |

(Continued)

*Primary Examiner* — Sahar Aqil Riaz
(74) *Attorney, Agent, or Firm* — Thomas Joseph; OGC Law

(57) ABSTRACT

A multimedia template creating computer system having a digital video production software application residing thereon. A media library resides on a computing device. A server has a master database for holding a data model having a plurality of video recipients and a list of custom multimedia tags for each of the plurality of video recipients and a cloud storage container. A video rendering computer system has a media compression and encoding software application residing thereon. The server connects to the multimedia template creating computer system and the video rendering computer system over a network. A multimedia template is sent from the multimedia template creating computer system to the server over the network. The media compression and encoding software application accesses the media library and the master database to convert the multimedia template into a plurality of customized videos with each customized video having a unique identifier corresponding to one of the plurality of video recipients. The media compression and encoding software application sends the plurality of customized videos to the server for storage in the cloud storage container. The server distributes each of the plurality of customized videos from the cloud storage container.

19 Claims, 10 Drawing Sheets

(56)　　　　　　References Cited

U.S. PATENT DOCUMENTS

| | | | |
|---|---|---|---|
| 2009/0076843 A1* | 3/2009 | Graff ...................... | G16H 80/00 |
| | | | 434/350 |
| 2009/0240736 A1 | 9/2009 | Crist | |
| 2011/0202344 A1* | 8/2011 | Meyer .................... | G10L 13/04 |
| | | | 704/260 |
| 2013/0091545 A1* | 4/2013 | Macdonald .......... | G06F 21/305 |
| | | | 726/2 |
| 2013/0198714 A1* | 8/2013 | Moody ............. | H04N 21/8545 |
| | | | 717/113 |
| 2013/0317936 A1* | 11/2013 | Hughes .................. | G06F 16/68 |
| | | | 707/E17.014 |
| 2014/0032667 A1* | 1/2014 | Wright ................ | G06Q 10/101 |
| | | | 709/204 |
| 2014/0171204 A1* | 6/2014 | Cox ........................ | A63F 13/30 |
| | | | 463/42 |
| 2014/0331265 A1* | 11/2014 | Mozell .................. | A63F 13/828 |
| | | | 725/93 |
| 2015/0181132 A1* | 6/2015 | Kummer ............ | H04N 21/4622 |
| | | | 348/598 |
| 2016/0313966 A1* | 10/2016 | Jeong .................. | G06F 3/04847 |
| 2017/0039867 A1* | 2/2017 | Fieldman .................. | G09B 7/00 |
| 2017/0134776 A1* | 5/2017 | Ranjeet ............... | G11B 27/031 |
| 2018/0232352 A1* | 8/2018 | Fulford .................... | G09B 5/00 |
| 2018/0280802 A1* | 10/2018 | Stroud .................... | A63F 13/67 |
| 2018/0330756 A1* | 11/2018 | MacDonald .......... | G06F 16/951 |
| 2019/0037252 A1* | 1/2019 | Wagenaar ............ | H04N 21/236 |
| 2021/0152871 A1* | 5/2021 | Haberman ............ | H04N 21/47 |
| 2021/0272599 A1 | 9/2021 | Patterson et al. | |
| 2021/0400142 A1* | 12/2021 | Jorasch .............. | H04L 65/1069 |

* cited by examiner

146          144

148

RECIPIENT
FIRST NAME          LAST NAME

HOME TOWN          MAJOR

ACTIVITIES/INTERESTS

HONORS

FIG. 3

VIDEO CREATION SYSTEM FOR MASS PRODUCTION AND DISTRIBUTION OF CUSTOM VIDEOS

CROSS REFERENCE TO RELATED APPLICATION

This application claims the benefit under 35 U.S.C. § 119 (c) of U.S. Provisional Application No. 63/442,784 entitled "VIDEO CREATION SYSTEM FOR MASS PRODUCTION AND DISTRIBUTION OF CUSTOM VIDEOS" filed Feb. 2, 2023, which is incorporated herein by reference.

BACKGROUND

Conventional production of customized media products consisted of "dubbing" or "splicing" media (e.g., vinyl records, audio cassette tapes, CDs, DVDs, etc.) with customized content. Typically, the resulting products that can be produced through these conventional processes are unsophisticated. Further, the ability to mass produce bulk quantities of customized media products is severely limited because the process is very labor intensive. Moreover, the ability to produce and to distribute bulk quantities of customized analog media products through automated processes does not exist.

The ability to manipulate and to distribute digital media has advanced substantially with the development of digital photography and associated computing devices. Further, the ubiquitous proliferation of digital media devices, such as smart phones, DVRs, MP3 players, MP4 players, iPod® players and other digital devices, has changed the way in which digital media (i.e., audio and video media) can be used. These developments have created a new demand in the marketplace to accommodate the desire for personalized, customized media products for the mass consumers. The trademark iPod® is a registered trademark of Apple Inc. of Cupertino, California.

Unfortunately, new methods of producing customized products have not overcome the limitations of conventional methods for producing customized media products. Specifically, such methods remain labor intensive and produce unsophisticated media products with limited capabilities for customization in both scope, size, and volume. As a result, an improved customized video production system for producing mass quantities of customized media is needed.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, an apparatus for distributing videos includes a multimedia template creating computer system having a digital video production software application residing thereon. A media library resides on a computing device. A server has a master database for holding a data model having a plurality of video recipients and a list of custom multimedia tags for each of the plurality of video recipients and a cloud storage container. A video rendering computer system has a media compression and encoding software application residing thereon. The server connects to the multimedia template creating computer system and the video rendering computer system over a network. A multimedia template is sent from the multimedia template creating computer system to the server over the network. The media compression and encoding software application accesses the media library and the master database to convert the multimedia template into a plurality of customized videos with each customized video having a unique identifier corresponding to one of the plurality of video recipients. The media compression and encoding software application sends the plurality of customized videos to the server for storage in the cloud storage container. The server distributes each of the plurality of customized videos from the cloud storage container.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

FIG. 3 illustrates an exemplary interface displaying a dashboard that includes a form for capturing information about video recipients in accordance with this disclosure.

DETAILED DESCRIPTION

Figure 1:
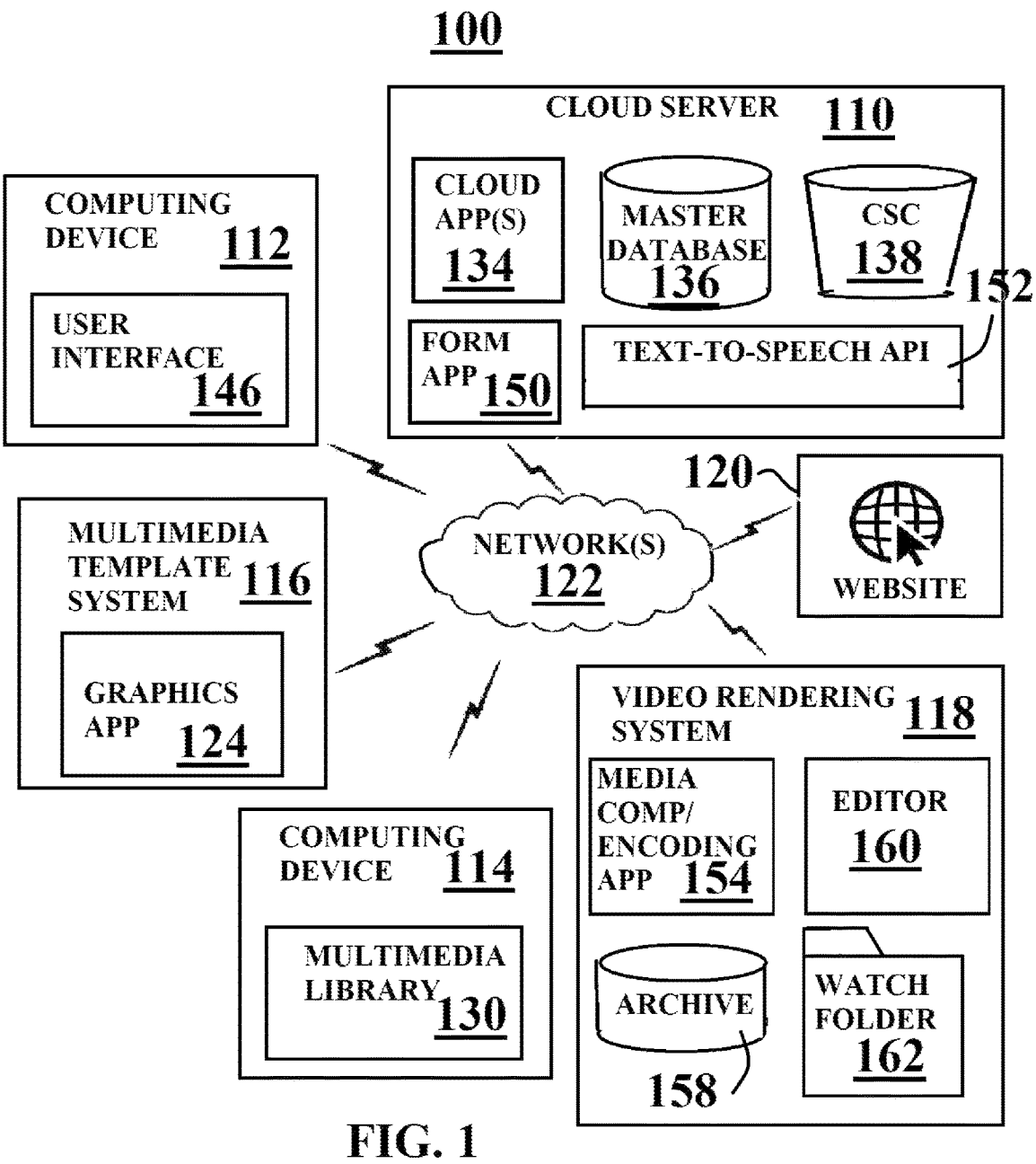
FIG. 1 is a block diagram for an exemplary embodiment of a mass customized video creation system in accordance with this disclosure.

The subject disclosure is directed to a customized video production system and, more specifically, to customized video production system that can create multiple, customized multimedia files for mass distribution in an automated manner. The system utilizes multimedia library and a template to form customized videos for a plurality of recipients. The videos are created through interactions between a cloud server and rendering computing systems and can be distributed from the cloud server through a website, via email, via text message or other similar means.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

The subject disclosure is directed to a unique video production platform that utilizes a custom application and commercial video production tools to merge unique, customized video templates with a database of information to create two or more unique videos at a time.

The videos are distributed through a cloud server that is connected to a media generating computer system and a rendering system. The media generating computer system generates a template for customized videos and uploads that template to the cloud server.

The cloud server obtains a data model that can be stored in a master database that includes a list of video recipients linked to the various custom attributes that will be incorporated into each custom video for each recipient. The cloud server merges the data model and the template to form a merged file and sends the merged file to the rendering system. The data model and the template can be merged on the cloud server with an application residing thereon.

Once the rendering system receives the merged file, the rendering system accesses a multimedia library that includes custom multimedia segments and standard multimedia segments. The rendering system utilizes the multimedia library and the merged file to render a custom video for each recipient. The rendering system can insert other features, such as custom text, into the custom video.

After the rendering system completes the rendering of each customized video, the rendering system can utilize each customized video to create a custom poster image that is associated with the customized video and can be displayed with the customized video prior to playback. Exemplary formats for the custom poster images include, but are not limited to, animated .gif images, static .jpeg/.jpg or .webp images. The rendering system can output customized poster images based on timecodes specified in the campaign or specified for each recipient.

The custom videos and the customized poster images are sent to the cloud server for distribution. Each custom video includes a unique identifier that corresponds to the recipient. In some embodiments, the recipients can access the customized videos through a web site. In other embodiments, the custom videos are sent to the recipients via text, email, or other similar means. In yet other embodiments, texts, email, or other similar forms of electronic messages are sent to the recipients with links therein, so that the recipients can click on the links to access the videos.

Exemplary applications for this system include applications in which personalized video messages are sent to successful applicants to universities, colleges, or other educational institutions. The system can also send customized congratulatory messages or other similar customized promotional announcements to a large number of video recipients. The technology has further applications within the fields of education, marketing, politics, or other similar fields. These examples are intended to be illustrative and non-limiting.

Figure 2:
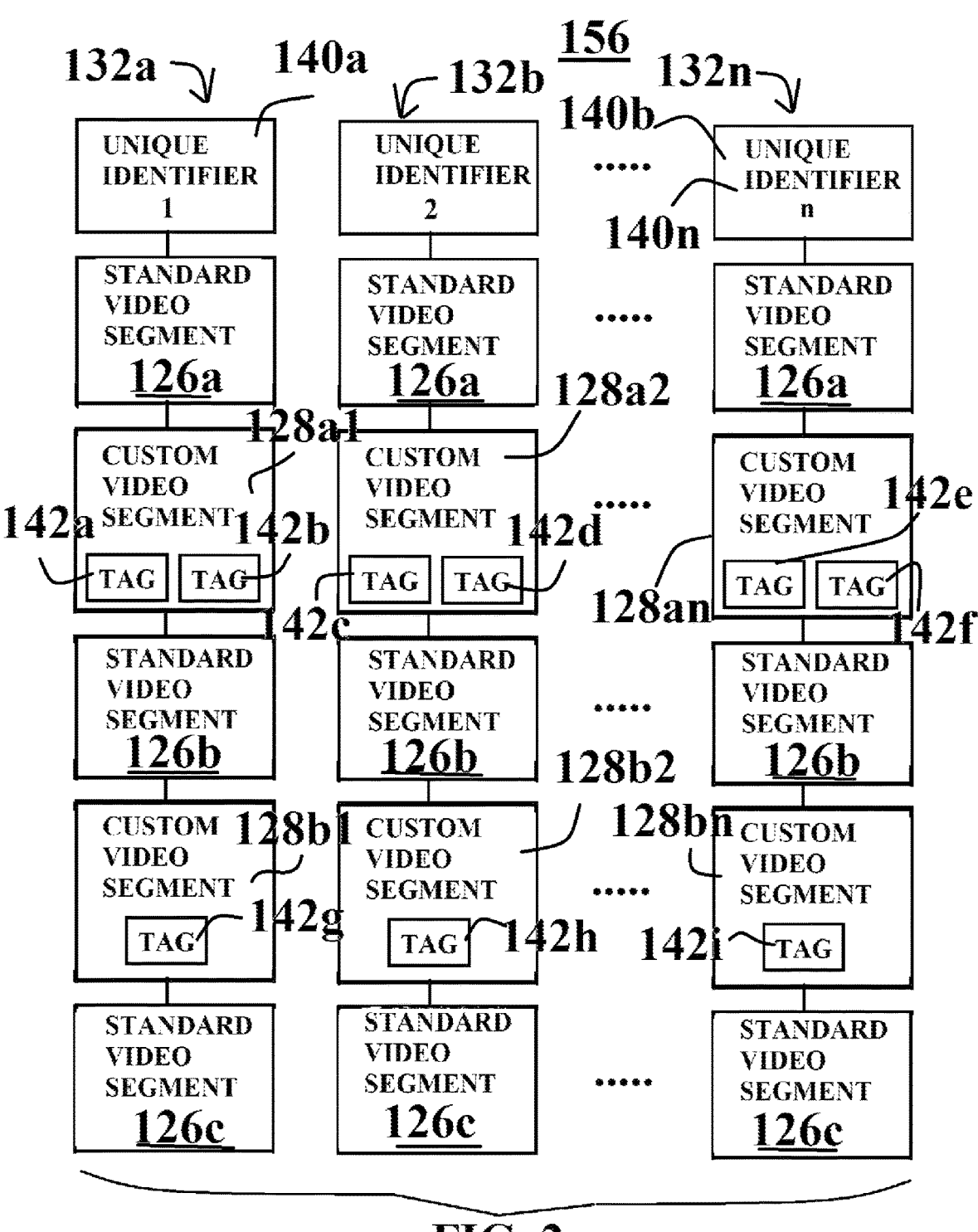
FIG. 2 is a block diagram illustrating a plurality of media templates for a plurality of recipients of customized videos produced in accordance with this disclosure.
Figure 3:
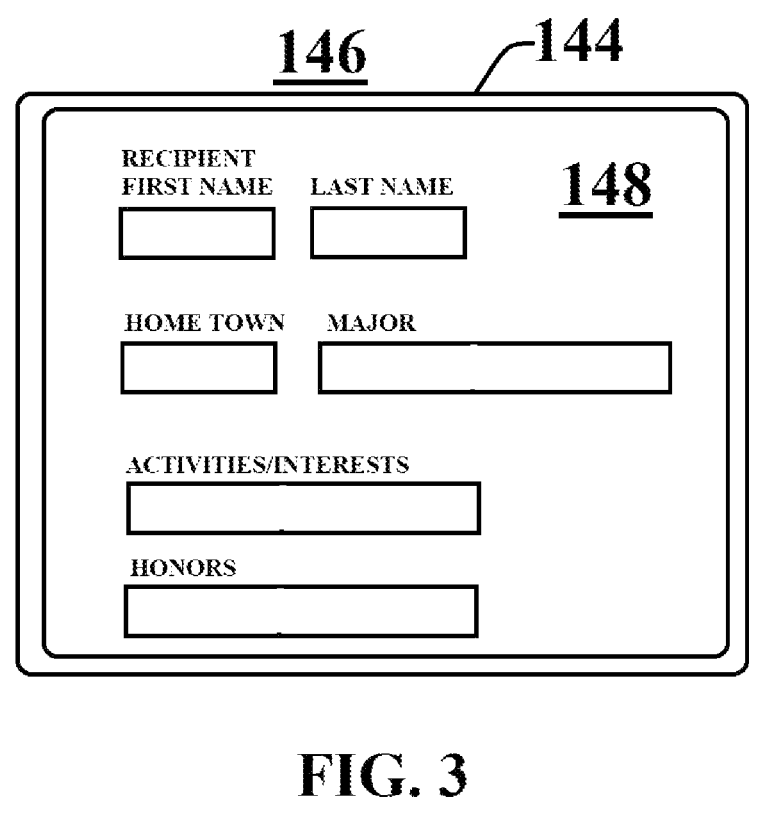

Referring to the drawings and, in particular, to FIGS. 1-3, a video creation and distribution system, generally designated by the numeral 100, is shown. The system 100 includes a cloud server 110, a pair of computing devices 112-114, a multimedia template creating computer system 116, a video rendering computer system 118, and a website 120 connected to one another over a network 122.

The multimedia template creating computer system 116 includes a digital video production software application 124, such as a motion graphics creation software application, that resides thereon. The software application 124 can be utilized to create a multimedia template and a plurality of multimedia video segments. In this exemplary embodiment, the software application 124 can be Apple Motion, a software application produced by Apple, Inc. of Cupertino, California for the macOS operating system. The software application 124 can be used to create and to edit motion graphics and for creating and for editing other visual effects. Other exemplary software applications include Adobe Premiere, Adobe Premiere Pro, or Adobe After Effects by Adobe, Inc. of Mountain View, California.

The multimedia video segments can include standard video segments 126a-126c and custom video segments 128a1-128bn. The standard video segments 126a-126c include generalized audio, video, text, graphics, and other multimedia content intended for an overarching narrative, theme, or message. The custom video segments 128a1-128bn include specific content for individual recipients to personalize and/or to customize the message for each particular recipient, using custom video, images, text, audio, and other similar customized content.

The standard video segments 126a-126c and the custom video segments 128al-128bn can be sent over the network 122 to a media library 130 that resides on computing device 114. The media library 130 can be accessed by the video rendering computer system 118 to produce custom videos 132a-132n utilizing the multimedia template.

The software application 124 can send the multimedia template to the cloud server 110 over the network 122. The cloud server 110 includes software applications 134, a master database 136, and one or more cloud storage containers 138. The cloud server 110 can be a component or server of any suitable cloud system, such as AWS (Amazon Web Services) by Amazon.com, Inc. of Seattle, Washington.

Other suitable cloud systems include Azure, Google Cloud, local storage, and other equivalent systems. Azure is provided by Microsoft Corporation of Redmond, Washington. Google Cloud is provided by Google LLC of Mountain View, California.

One of the applications 134 can map all variable data fields from a project model. For example, a project can have text variables for first name and last name, a video variable for favorite vacation destination. The mapping application can map reference to those text and video variables in the project to the associated text and video variables in the model.

Another one of the applications 134 can enable a web-based administration portal, which can be unique for each project. The application 134 can be used to manage tasks related to the project. In such embodiments, the portal will be accessible using unique, encrypted usernames and passwords for clients and managers. In such embodiments, the client is any entity who has entered in a contractual agreement to utilize the system 100. A manager is any individual permitted access to the portal due to his or her relationship to the client.

The master database 136 can be a unique database associated with each project. The master database 136 can be a MySQL, SQL Server, or other database. MySQL is an open-source relational database management system. SQL Server can refer to a relational database management system developed by Microsoft Corporation of Redmond, Washington.

The cloud storage containers 138 can be Amazon S3 buckets, which are public cloud storage resources within the AWS Simple Storage Service (S3), or Azure blob storage or blobs. Each cloud storage container 138 can represent an object storage offering, which is similar to a file folder, for storing objects including data and descriptive metadata.

The master database 136 can store a data model that includes a list of unique identifiers for each of the individual video recipients 140a-140n, associated data about the individual video recipients 140a-140n, and a plurality of tags 142a-142i. Each of the tags 142a-142i can correspond to specific multimedia content or placements that can be inserted into the custom videos 132a-132n at the appropriate place for a specific one of the individual video recipients 140a-140n.

It should be understood that the master database 136 can include multiple data models for one or more project. Each data model can be appended or otherwise formed in a piecemeal fashion, as the needs of a client for a particular project change.

As indicated in FIG. 3, the multimedia placements can include text, graphics, fonts, video clips, audio, music, geographic-based video segments or other similar multimedia content. In embodiments that are utilized to produce higher education-related custom videos, some of the tags 142a-142i can include multimedia content relating to a specific college major, recipient interests, hobbies, or activities, or honors.

As shown in FIGS. 1-3, the data model can be stored in a spreadsheet, obtained from Customer Relationship Management (CRM) software, or created through a customer dashboard 144 displayed on a user interface 146 that facilitates the manual entry of video recipient information through a web-enabled form 148. In this exemplary embodiment, the cloud server 110 includes an application 150 for generating the form 148 through the user interface 146 residing on computing device 112.

Unique data can be uploaded or created for one or more video recipients and entered into a model in repeatable steps. Data can be uploaded in bulk (2 or more users) via either a portal or File Transfer Portal (FTP) using .csv or .xls files. Data can be inserted one recipient at a time via a web form in the portal. Data can be inserted one recipient at a time via a publicly accessing web form. All uploaded data will be stored in the master database 136. In some embodiments, data can be uploaded via an Application Programming Interface (API) configured to facilitate data transfer.

Upon upload/creation of data, one of the applications 134 will merge each data model segment for each recipient with the project and create a new unique file that has a file name that is unique using the User ID. The unique file replaces placeholder tokens in the project with variables data contained in the model. Each file will constitute a new, unique project. The application 134 can create one or many new, unique project file(s) at a time.

In some embodiments, the cloud server 110 can include a text-to-speech API 152 that can be used to generate customized audio files that include synthesized speech in accordance with a script that can produced through the user interface 146, or through a data entry or word processing application (not shown). In this exemplary embodiment, the text-to-speech API 152 is Amazon Polly by Amazon.com, Inc. of Seattle, Washington.

As shown in FIG. 1, the video rendering computer system 118 can include a media compression and encoding software application 154. The software application 154 can receive the merged file from the cloud server 110 over the network 122. The merged data model and multimedia template can be delivered to the software application 154 in the form of a file containing code 156 that includes code segments for the unique identifiers for each of the video recipients 140a-140n, the standard video segments 126a-126c and the custom video segments 128a1-128bn for each of the custom videos 132a-132n.

Then, the software application 154 can access the multimedia library 130 to render custom videos 132a-132n for the video recipients 140a-140n. The custom videos 132a-132n can be sent to the cloud server 110 over the network 122 for storage in the cloud storage container 138.

Copies of the custom videos 132a-132n can be stored in an archive 158 residing on the video rendering computer system 118. The maintenance of an archive 158 on the video rendering computer system 118 can prevent black boxes and enhance the robustness of the system 100.

The media compression and encoding software application 154 can be a video and audio media compression and encoding application and/or a studio application for multimedia rendering. Exemplary applications include Apple Motion, Apple Compressor, Apple Final Cut Pro, Apple Logic Pro on Mac OS by Apple, Inc. of Cupertino, California.

As shown in FIG. 1, the video rendering computer system 118 can include an editor 160, which can be a non-linear editor. In this exemplary embodiment, the editor 160 can be Apple Motion by Apple, Inc. of Cupertino, California. In some embodiments, the video rendering computer system 118 can be a rendering farm or part of a rendering farm.

The video rendering computer system 118 can include a watch folder 162 for synching the video rendering computer system 118 with the cloud storage container 138. The software application 154 will periodically check the watch folder 162 for incoming jobs to automate the video production process.

The watch folder 162 can include queued files. The cloud app 134 and software application 154 will monitor and log the copying of each file to ensure the archive 158 and watch folder 162 are in sync. If there is an error that occurs in the copying process, the cloud app 134 and the software application 154 will log the problem(s) and send an automated message to the system administrator to re-render the problematic file(s) again, automatically.

The video rendering system 118 will detect the new files in the watch folder 162. The video rendering system 118 will render each file into a new unique video based on the data related to the recipient. Each custom video will have a file name that includes the unique ID of the recipient. Each set of custom videos will be exported with unique export settings (ex. 4 k .mp4 using Rec709 at 3000 kbps and 4 k .mov using Rec2020 at 35000 kpbs).

As indicated in FIGS. 1-3, the system 100 can distribute the custom videos 132a-132n from the cloud storage container 138 on the cloud server 110 through the website 120. Each of the custom videos 132a-132n is assigned a unique Uniform Resource Locator (URL) that can correspond to the unique identifiers for the video recipients 140a-140n. The URLs can be accessed by clicking a link on a dashboard page on the website 120 that contains the corresponding URL. In various embodiments, the custom videos 132a-132n can be displayed on customized web pages, mobile applications, or other similar graphical interfaces.

Each of the computing devices 112-114 can be any type of computing device, including a server, a smartphone, a handheld computer, a tablet, a PC, or any other computing device. The multimedia template creating computer system 116 and the video rendering computer system 118 can reside on individual computing devices or computer systems. The computing devices 112-114, the multimedia template creating computer system 116, and/or the video rendering computer system 118 can be/reside on the same computing device or computer system, can be/reside on individual computing devices or computer system, and/or can be/reside on any combination thereof.

Network 122 can be implemented by any type of network or combination of networks including, without limitation: a wide area network (WAN) such as the Internet, a local area network (LAN), a Peer-to-Peer (P2P) network, a telephone network, a private network, a public network, a packet network, a circuit-switched network, a wired network, and/or a wireless network. Computer systems and/or computing devices can communicate via network 122 using various communication protocols (e.g., Internet communication protocols, WAN communication protocols, LAN communications protocols, P2P protocols, telephony protocols, and/or other network communication protocols), various authentication protocols, and/or various data types (web-based data types, audio data types, video data types, image data types, messaging data types, signaling data types, and/or other data types).

Figures 4, 5:
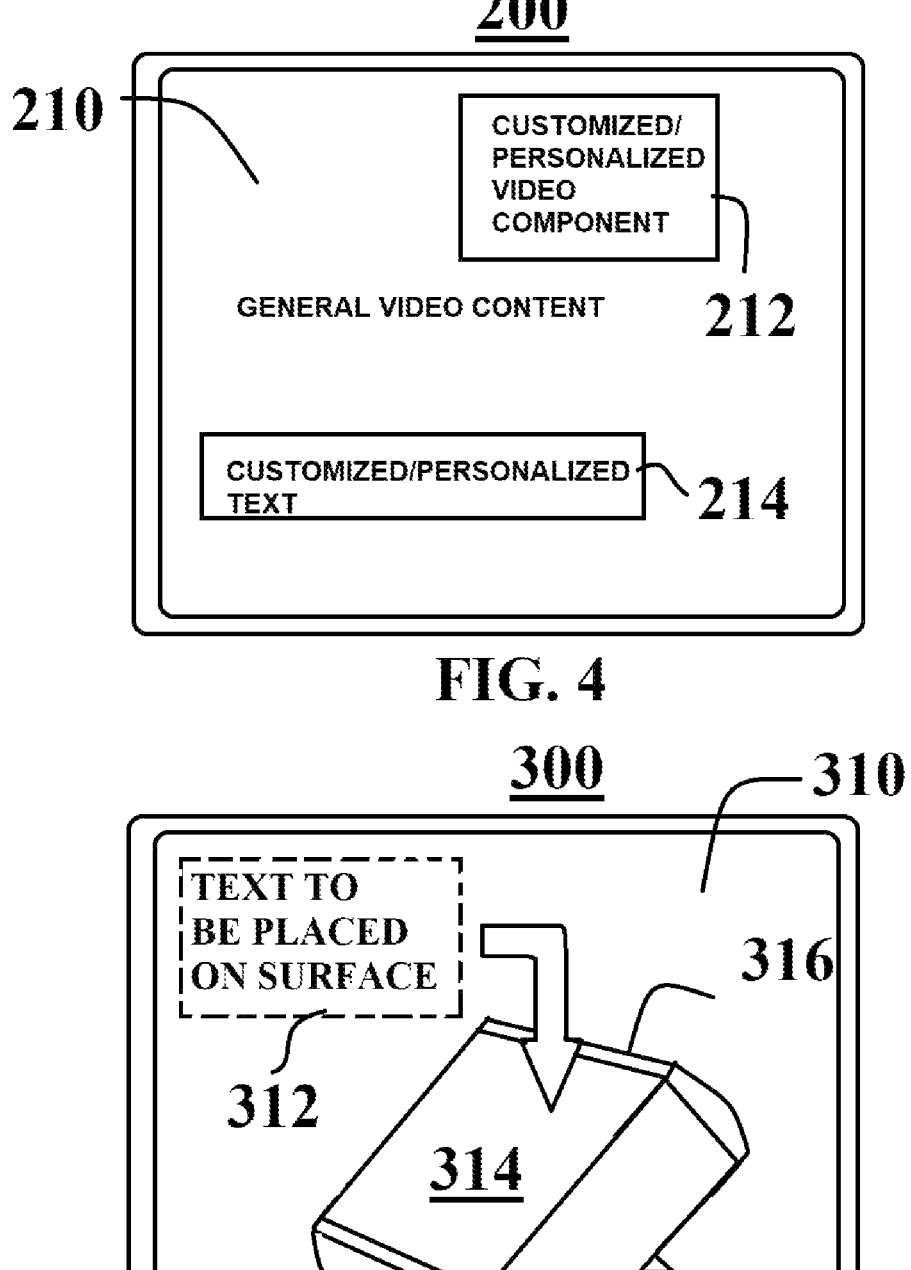
FIG. 4 illustrates an exemplary interface displaying a frame of a customized video in accordance with this disclosure.
FIG. 5 illustrates another exemplary interface displaying a frame of a customized video in accordance with this disclosure.

Referring to FIG. 4 with continuing reference to the foregoing figures, an exemplary interface, generally designated by the numeral 200, is shown. The interface 200 displays an exemplary video frame 210 from a custom video segment, such as one of the custom video segments 128a1-128bn shown in FIG. 2. The video frame 210 includes customized multimedia components 212-214 that are inserted into a customized video, such as the custom videos

132a-132n shown in FIG. 2, by the media compression and encoding software application 154 shown in FIG. 1.

Referring to FIG. 5 with continuing reference to the foregoing figures, another exemplary interface, generally designated by the numeral 300, is shown. The interface 300 displays an exemplary video frame 310 from a custom video segment, such as one of the custom video segments 128a1-128bn shown in FIG. 2.

FIG. 5 illustrates the insertion of text 312 on a surface 314 of an object 316 depicted in three dimensions. The insertion operation can be performed by a digital video editing system, motion graphics editing system, or non-linear editor that has the ability to edit or manipulate a video and is not limited to editing a single track or a single frame at a time. The operation can be performed by the editor 160 shown in FIG. 1.

The editor can editor can rotate, skew, transform, and otherwise modify or customize the text 312, so that the placement is consistent with the sloped depiction of the surface 314. The use of the editor provides a smoother placement and a more realistic depiction of the text 312 and object 316.

It should be understood that the operations are not limited to operations in which the text 312 is placed on the object 316, but can include operations where the text 312 is placed relative to or tracked in relation to the object 316. Photos and videos can be placed on the object 316.

Figure 6:
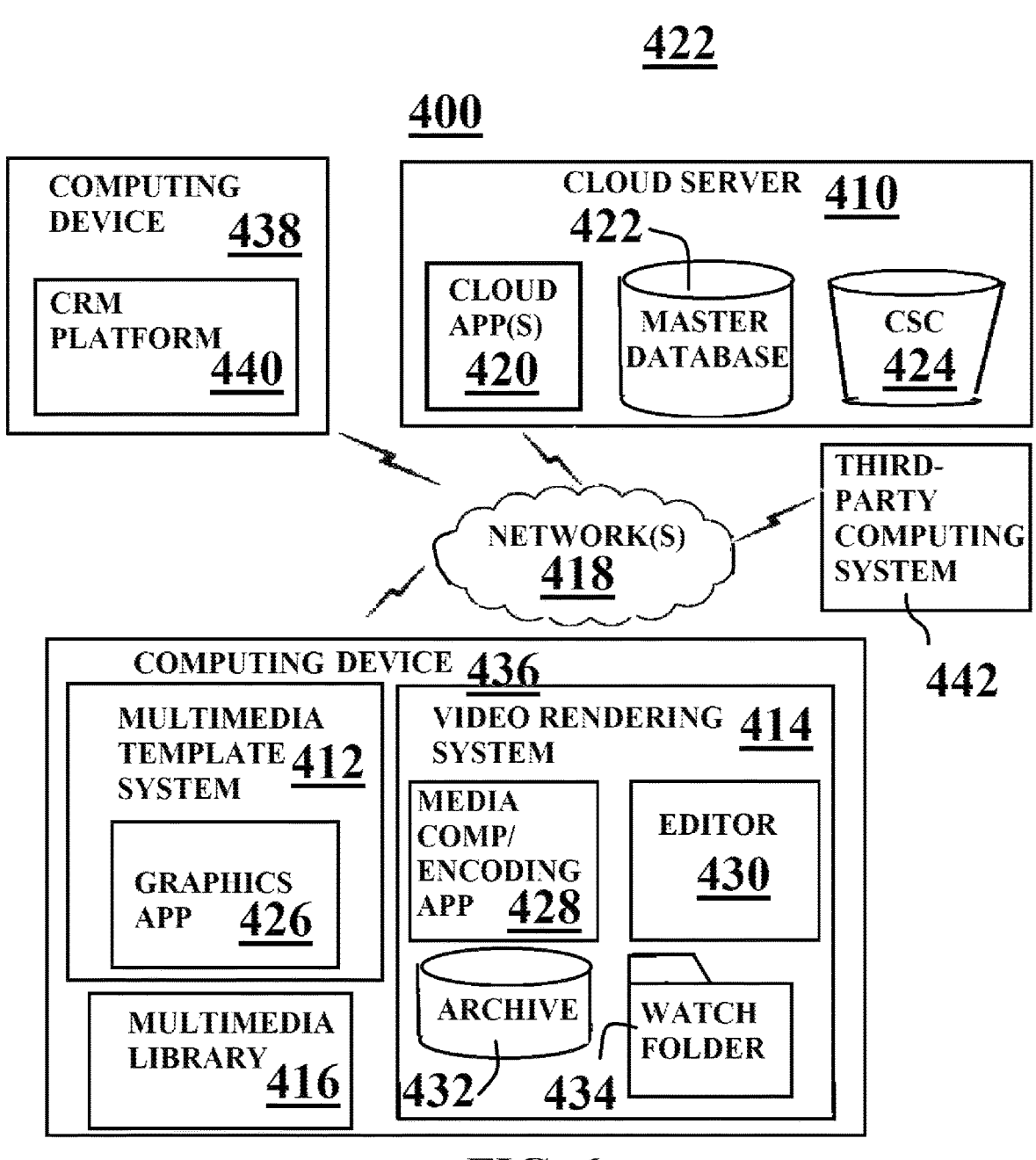
FIG. 6 is a block diagram for another exemplary embodiment of a mass customized video creation system in accordance with this disclosure.

Referring now to FIG. 6 with continuing reference to the foregoing figures, another embodiment of a video creation and distribution system, generally designated by the numeral 400, is shown. Like the embodiment shown in FIGS. 1-3, the system 400 includes a cloud server 410, a multimedia template creating computer system 412, a video rendering computer system 414, and a multimedia library 416. The cloud server 410 connects to a network 418.

The cloud server 410 includes cloud applications or apps 420, a master database 422, and one or more cloud storage containers 424 that function in a similar manner as their counterparts shown in FIG. 1. Similarly, the multimedia template creating computer system 412 includes a digital video production software application 426, and the video rendering computer system 414 includes a media compression and encoding software application 428, an editor 430, an archive 432, and a watch folder 434 that function in a similar manner as their counterparts shown in FIG. 1.

Unlike the embodiments shown in FIGS. 1-3, the multimedia template creating computer system 412, the video rendering computer system 414, and the multimedia library 416 reside upon the same computing device 436. The computing device 436 connects to the cloud server 410 over the network 418.

The system 400 can include another computing device 438 having CRM software 440 residing thereon. The computing device 438 can connect to the cloud server 410 over the network 418. The CRM software 440 can produce a data model that can be sent to the cloud server 410 to produce a plurality of custom video, such as the custom videos 132a-132n shown in FIG. 2, with the video rendering computer system 414.

As indicated in FIG. 6, the cloud server 410 can send the custom videos to a third party computing system 442 for distribution via email communication, text, or other similar means.

Figure 7:
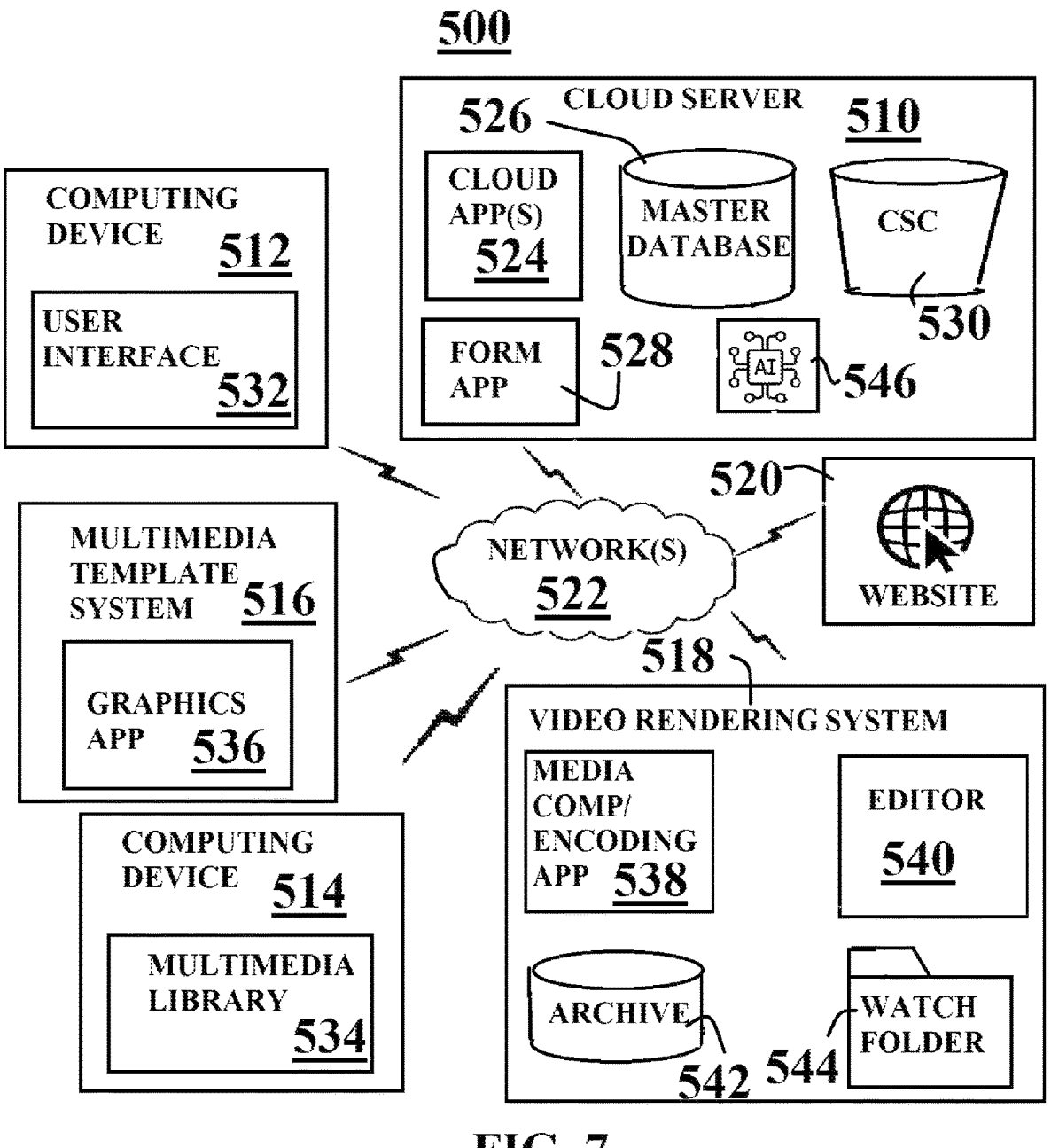
FIG. 7 is a block diagram for another exemplary embodiment of a mass customized video creation system in accordance with this disclosure.
Figure 8:
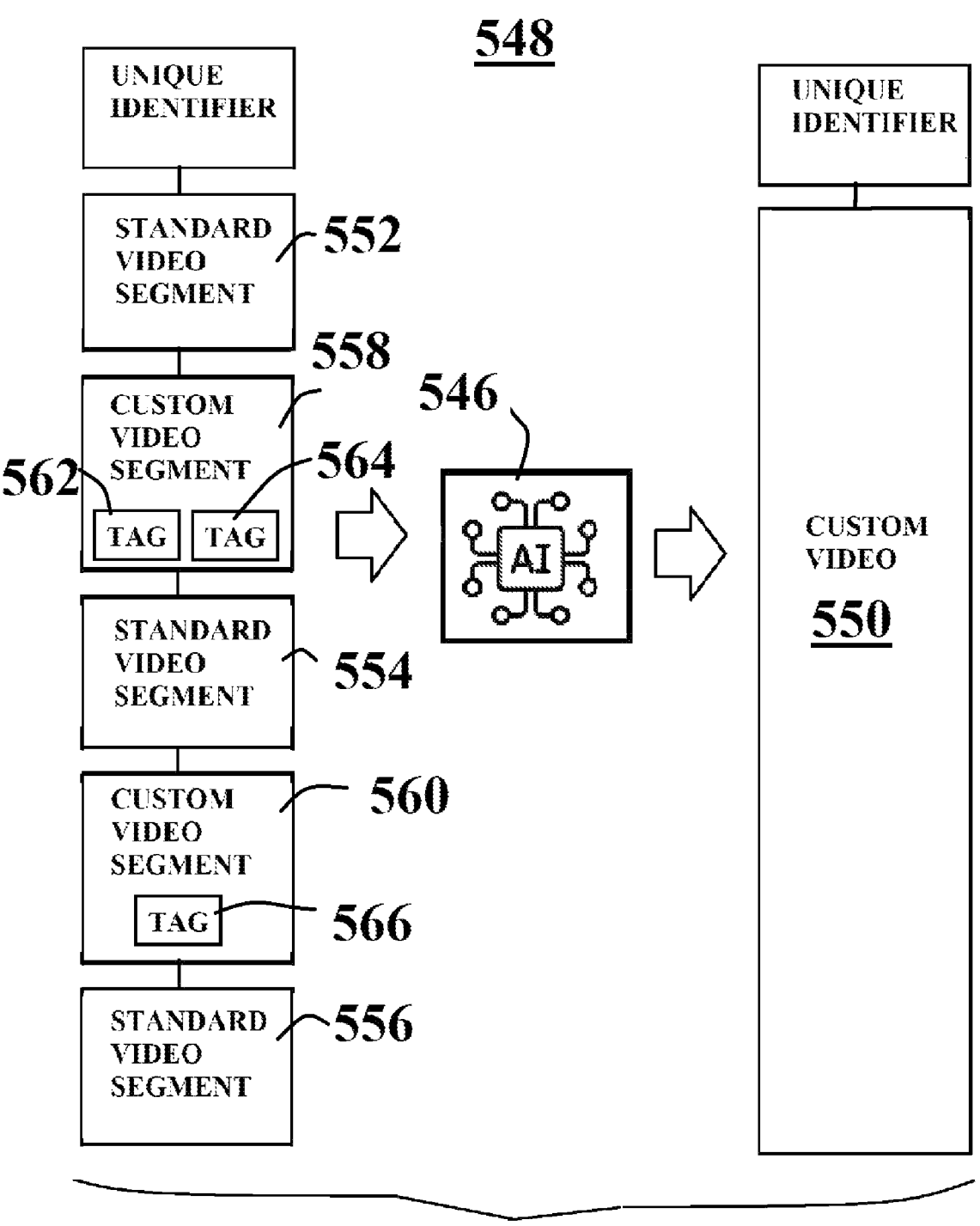
FIG. 8 is a block diagram illustrating a media template and a customized video produced in accordance with this disclosure.

Referring now to FIGS. 7-8 with continuing reference to the foregoing figures, another embodiment of a video creation and distribution system, generally designated by the numeral 500, is shown. Like the embodiment shown in FIGS. 1-3, the system 500 includes a cloud server 510, computing devices 512-514, a multimedia template creating computer system 516, a video rendering computer system 518, and a website 520 connected with a network 522.

The cloud server 510 includes cloud applications or apps 524, a master database 526, a form-generating app 528 and one or more cloud storage containers 530 that function in a similar manner as their counterparts shown in FIG. 1. The computing device 512 includes a user interface 532 that cooperates with the form-generating app 528 to facilitate data entry for the master database 526.

A media library 534 resides on computing device 514. The media library 534 can include content created by a digital video production software application 536, which is part of the multimedia template creating computer system 516. The media library 534 and the digital video production software application 536 are similar to their counterparts shown in FIG. 1.

Like the embodiment shown in FIGS. 1-3, the video rendering computer system 518 includes a media compression and encoding software application 538, an editor 540, an archive 542, and a watch folder 544. Unlike the embodiment shown in FIGS. 1-3, the cloud server 510 includes an artificial intelligence component 546 that can interact with the media compression and encoding software application 538 and/or the editor 540 to edit code 548 that can be used to produce custom videos, such as the custom video 550 shown in FIG. 8.

The custom video 550 can include standard video segments 552-556, custom video segments 558-560, and/or tags 562-566. The custom video 550 can include a unique identifier 568 that is similar to the unique identifiers 140a-140n shown in FIG. 2.

The artificial intelligence component 546 provides the ability to edit the complete code 548, including the standard video segments 552-556, the custom video segments 558-560, and/or the tags 562-566, to produce the custom video 550 with a greater degree of customization as compared to the custom videos 132a-132n shown in FIG. 1.

The artificial intelligence component 546 can perform various operations, including deconstructing a multimedia template to create the code 548. The artificial intelligence component 546 can modify and/or manipulate the standard video segments 552-556, custom video segments 558-560, and/or tags 562-566 within the code 548 to produce the custom video 550.

The artificial intelligence component 546 can remove one or more of the standard video segments 552-556, custom video segments 558-560, and/or tags 562-566 for a particular video. In some embodiments, the artificial intelligence component 546 can change video attributes, such as colors, texts, audio or other similar features.

Unlike the embodiments shown in FIGS. 1-6, the system 500 does not merely examine custom video attributes, tag the attributes, and catalog the attributes. The artificial intelligence component 546 provides the system 500 with the ability to examine the attributes and to make judgments about changing the attributes and the surrounding attributes.

The artificial intelligence component 546 can be an artificial intelligence application and/or a machine learning application. The artificial intelligence component 546 can emulate human thought and perform tasks in a real-world environment, namely identifying patterns, making decisions, and improving operations through experience and data. The artificial intelligence component 546 can use deep learning, neural networks, computer vision, and natural language processing.

Figure 9:
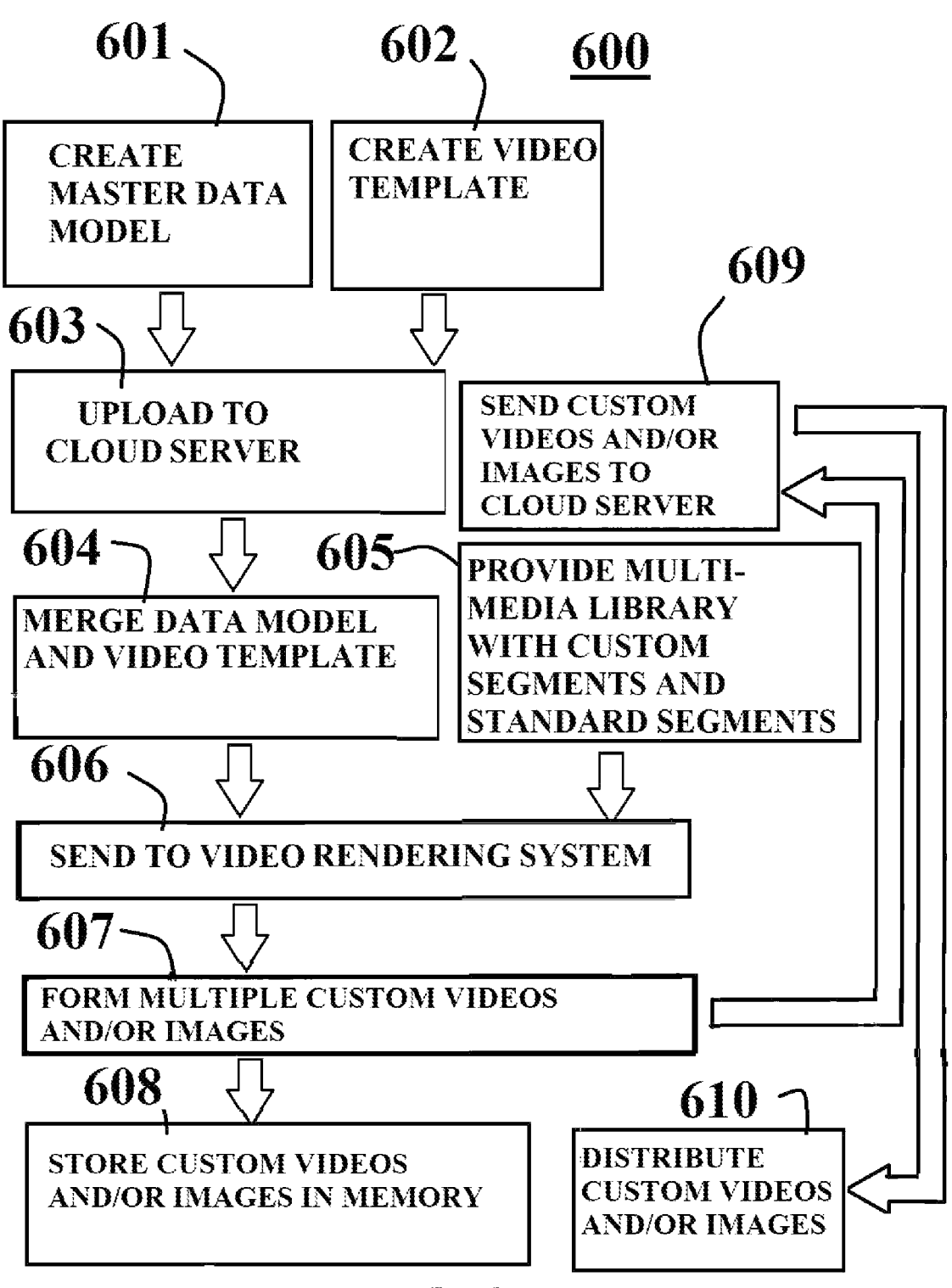
FIG. 9 illustrates an exemplary process in accordance with this disclosure.

Referring now to FIG. 9 with continuing reference to the foregoing figures, an exemplary process, generally designated by the numeral 600, for creating and for distributing bulk quantities of customized multimedia products is shown. The process 300 can be a performed within the system 100 shown in FIGS. 1-3, the system 400 shown in FIG. 6, and/or the system 500 shown in FIGS. 7-8. The process 600 can be used to perform operations resulting in the output shown on the interfaces 200 and 300 shown in FIGS. 4-5, as well.

At 601, a master data model is created. In this exemplary embodiment, the master data model includes a list of video recipients and one or more custom attributes for each user that will correspond to custom video segments or features in the corresponding final custom video. The master data model can be stored in a spreadsheet, obtained from CRM software, or created via data entry through a form-based software application.

At 602, a multimedia template is created. The multimedia template can include references to a plurality of standard video segments, custom video segments, and multimedia tags for indicating where certain multimedia components should be inserted into the custom video. The custom components are variable (e.g., Favorite vacation destination, text for a first name).

A data model can contain data for each component, as well as other information (ex. user ID). Each row in the data model will correspond with a unique user and the data contained therein with be used to create a unique, custom video. The model must include a unique ID (the ID) for each recipient. In some embodiments, data from third-party APIs (e.g., text to speech generators like AWS Polly), machine learning algorithms, or other similar components can be incorporated into the data model.

At 603, the data model and the multimedia template are uploaded to a cloud server. In this exemplary embodiment, the cloud server can be the cloud server 110 shown in FIG. 1, the cloud server 410 shown in FIG. 6, and/or the cloud server 510 shown in FIG. 7.

The data model and the multimedia template can be uploaded into cloud storage. In some embodiments, the data model and the multimedia template can be uploaded to different locations.

At 604, the data model and the multimedia template are merged. In this exemplary embodiment, the data model and the multimedia template are merged on the cloud server to form a merged file.

At 605, a multimedia library is provided to the video rendering system. The contents of the multimedia library can include custom video segments and standard video segments.

The multimedia library can store all variable components, except for text, that is required for a project. For example, if the project has a variable video section for "favorite vacation destination" then two or more video files can be available (ex. Key West, Outer Banks, Hilton Head, and Destin Beach) and stored in the multimedia library. The text can be added to the rendered videos by the rendering system without the need to utilize the multimedia library, although systems are contemplated in which the rendering system utilizes the multimedia library to add text to the custom videos.

The multimedia library can include various forms of multimedia, including videos (e.g., .mov, .mp4 files), photos (e.g., .jpg, .png files), music and other audio tracks (e.g., .aiff, .wav, .mp3 files), text (any fonts, colors, styles, sizes), 3D Objects (e.g., .usdz, .obj files), and other similar forms of multimedia.

At 606, the merged file is sent to the video rendering system. In this exemplary embodiment, the video rendering system can be the video rendering system 118 shown in FIG. 1, the video rendering system 414 shown in FIG. 6, and/or the video rendering system 518 shown in FIG. 7.

At 607, the video rendering system converts the merged file into the custom videos using the custom video segments and the standard video segments from the multimedia library. In some instances, the video rendering system can utilize each customized video to create a custom poster image (or images) that is (are) associated with the customized video and can be displayed with the customized video prior to playback.

At 608, the custom videos and/or the custom poster image(s) are stored in an archive. In this exemplary embodiment, the archive can be the archive 158 shown in FIG. 1, the archive 432 shown in FIG. 6, and/or the archive 542 shown in FIG. 7.

At 609, the custom videos and/or the custom poster image(s) can be sent to the cloud server. The cloud server can distribute the custom videos and/or the custom poster image(s) at Step 610. In some embodiments, the custom videos and/or the custom poster image(s) can be distributed through websites, such as website 120 shown in FIG. 1 and/or website 520 shown in FIG. 7. In other embodiments, the custom videos and/or the custom poster image(s) can be distributed through a third party system, such as third party computing system 442 shown in FIG. 6.

Exemplary Cloud Architecture

Figure 10:
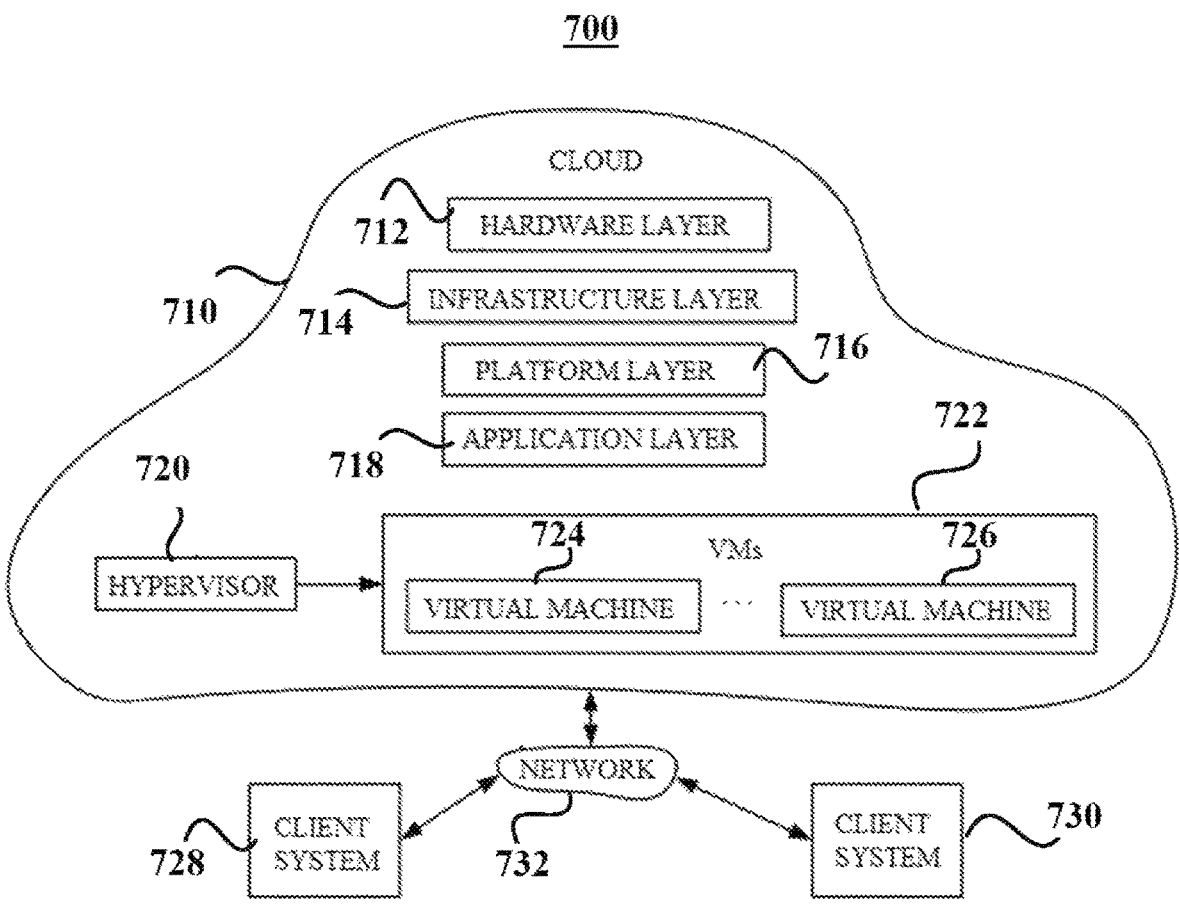
FIG. 10 illustrates a block diagram of a cloud-based computing system operable to execute the disclosed systems and methods in accordance with this disclosure.

Referring to FIG. 10 with continuing reference to the foregoing figures, exemplary cloud architecture, generally designated by the numeral 400, for implementing the system 100 shown in FIG. 1, the system 400 shown in FIG. 6, and/or the system 500 shown in FIG. 7.

Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 700 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud can be managed by the organization itself and the infrastructure is typically not shared with other organizations. The organization still maintains the hardware to some extent, such as installations and repairs, etc.

As shown in FIG. 10, the cloud architecture 700 includes a cloud 710. The cloud 710 (or each of the different premises on the cloud 710) can include a hardware layer 712, an infrastructure layer 714, a platform layer 716, and an application layer 718.

A hypervisor 720 can illustratively manage or supervise a set of virtual machines 722 that can include a plurality of different, independent, virtual machines 724-726. Each virtual machine can illustratively be an isolated software container that has an operating system and an application inside it. It is illustratively decoupled from its host server by hypervisor 720. In addition, hypervisor 720 can spin up additional virtual machines or close virtual machines, based upon workload or other processing criteria.

A plurality of different client systems 728-730 (which can be end user systems or administrator systems, or both) can illustratively access cloud 710 over a network 732. Depending upon the type of service being used by each of the client systems 728-730, cloud 710 can provide different levels of service. In one example, the users of the different client systems are provided access to application software and databases. The cloud service then manages the infrastructure and platforms that run the application. This can be referred to as software as a service (or SaaS). The software providers operate application software in application layer 712 and end users access the software through the different client systems 728-730.

The cloud provider can also use platform layer 716 to provide a platform as a service (PaaS). This involves an operating system, programming language execution environment, database and webserver being provided to the client systems 728-730, as a service, from the cloud provider. Application developers then normally develop and run software applications on that cloud platform and the cloud provider manages the underlying hardware and infrastructure and software layers.

The cloud provider can also use infrastructure layer 714 to provide infrastructure as a service (IaaS). In such a service, physical or virtual machines and other resources are provided by the cloud provider, as a service. These resources are provided, on-demand, by the IaaS cloud provider, from large pools installed in data centers. In order to deploy applications, the cloud users that use IaaS install operating-system images and application software on the cloud infrastructure 700.

It should also be noted that architecture 700, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Exemplary Computer System

Figure 11:
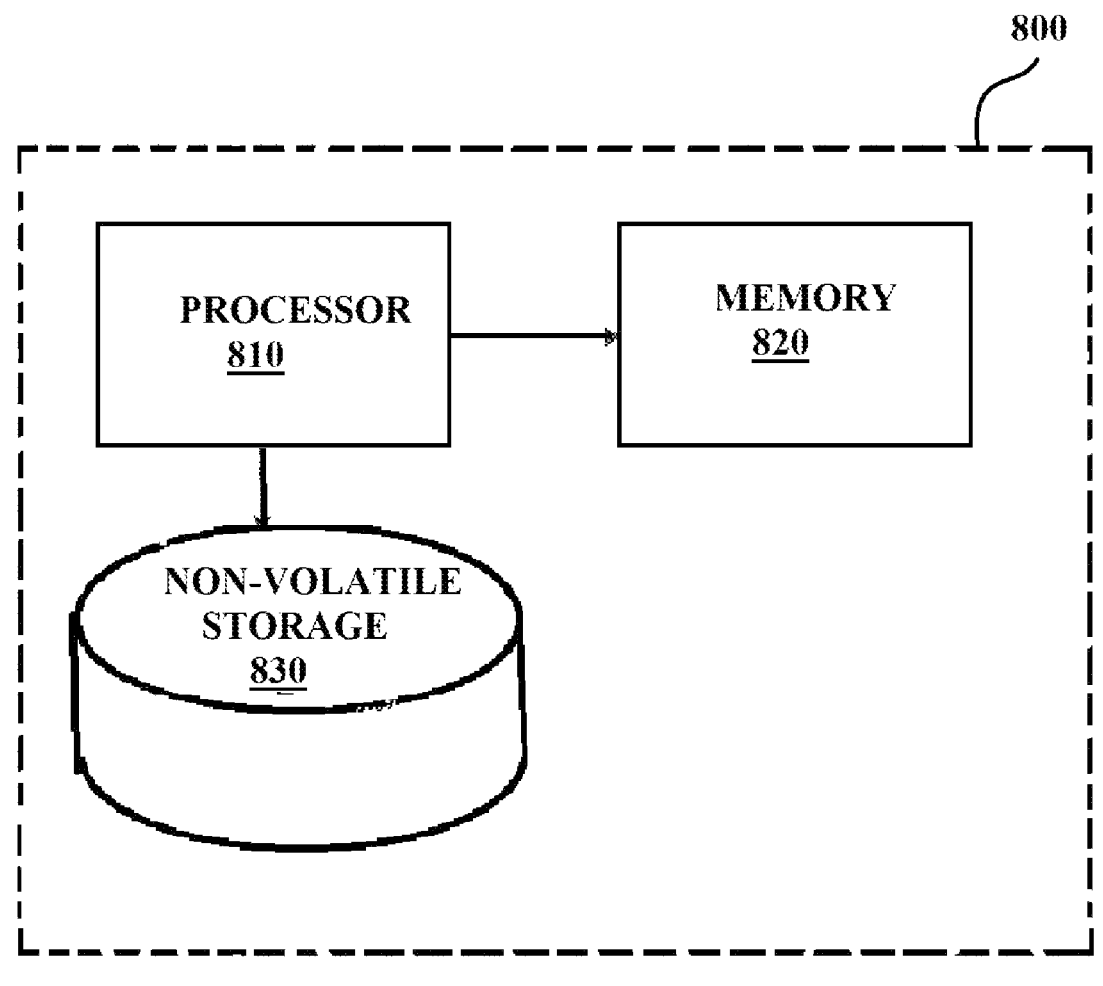
FIG. 11 illustrates a schematic diagram of a computing system operable to execute the disclosed systems and methods in accordance with this disclosure.

Referring now to FIG. 11 with continuing reference to the forgoing figures, an illustrative implementation of a computing device or computer system 800 that can be used in connection with any of the embodiments of the disclosure provided herein is shown. The computer system 800 can include one or more processors 810 and one or more articles of manufacture that comprise non-transitory computer-readable storage media (e.g., memory 820 and one or more non-volatile storage media 830). The processor 810 can control writing data to and reading data from the memory 820 and the non-volatile storage device 830 in any suitable manner. To perform any of the functionality described herein, the processor 810 can execute one or more processor-executable instructions stored in one or more non-transitory computer-readable storage media (e.g., the memory 820), which can serve as non-transitory computer-readable storage media storing processor-executable instructions for execution by the processor 810.

The terms "program" or "software" are used herein in a generic sense to refer to any type of computer code or set of processor-executable instructions that can be employed to program a computer or other processor to implement various aspects of embodiments as discussed above.

References to a "module", "a software module", and the like, indicate a software component or part of a program, an application, and/or an app that contains one or more routines. One or more independently modules can comprise a program, an application, and/or an app.

References to an "app", an "application", and a "software application" shall refer to a computer program or group of programs designed for end users. The terms shall encompass standalone applications, thin client applications, thick client applications, web-based applications, such as a browser, and other similar applications.

Additionally, it should be appreciated that according to one aspect, one or more computer programs that when executed perform methods of the disclosure provided herein need not reside on a single computer or processor, but can be distributed in a modular fashion among different computers or processors to implement various aspects of the disclosure provided herein. Processor-executable instructions can be in many forms, such as program modules, executed by one or more computers or other devices. Generally, program modules include routines, programs, objects, components, data structures, etc., that perform particular tasks or implement particular abstract data types. Typically, the functionality of the program modules can be combined or distributed as desired in various embodiments.

Also, data structures can be stored in one or more non-transitory computer-readable storage media in any suitable form. For simplicity of illustration, data structures can be shown to have fields that are related through location in the data structure. Such relationships can likewise be achieved by assigning storage for the fields with locations in a non-transitory computer-readable medium that convey relationship between the fields. However, any suitable mechanism can be used to establish relationships among information in fields of a data structure, including through the use of pointers, tags or other mechanisms that establish relationships among data elements.

Supported Features and Embodiments

The detailed description provided above in connection with the appended drawings explicitly describes and supports various features of a mass customized video creation system. By way of illustration and not limitation, supported embodiments include an apparatus for distributing videos comprising: a multimedia template creating computer system having a digital video production software application residing thereon; a media library residing on a computing device; a server having a master database for holding a data model having a plurality of video recipients and a list of custom multimedia tags for each of the plurality of video recipients and a cloud storage container; and a video rendering computer system having a media compression and encoding software application residing thereon; wherein the server connects to the multimedia template creating computer system and the video rendering computer system over a network; wherein a multimedia template is sent from the multimedia template creating computer system to the server over the network; wherein the media compression and encoding software application accesses the media library and the master database to convert the multimedia template into a plurality of customized videos with each customized video having a unique identifier corresponding to one of the plurality of video recipients; wherein the media compression and encoding software application sends the plurality of customized videos to the server for storage in the cloud storage container; and wherein the server distributes each of the plurality of customized videos from the cloud storage container.

Supported embodiments include the foregoing apparatus, wherein the server embeds a user interface having a form for receiving input from a user to create the data model.

Supported embodiments include any of the foregoing apparatus, wherein the data model is stored in a spreadsheet that is transferred from the multimedia template creating computer system to the server.

Supported embodiments include any of the foregoing apparatus, wherein the media library includes at least one of video segments, audio segments, graphics, text, fonts, video clips, audio, music, and geographic-based video segments for forming the plurality of customized videos.

Supported embodiments include any of the foregoing apparatus, further comprising a non-linear editor for performing three-dimensional editing operations.

Supported embodiments include any of the foregoing apparatus, wherein the video rendering computer system includes an archive for storing copies of the plurality of customized videos thereon.

Supported embodiments include any of the foregoing apparatus, wherein the video rendering computer system includes a watch folder.

Supported embodiments include any of the foregoing apparatus, wherein each of the plurality of the plurality of customized videos includes a unique hyperlink.

Supported embodiments include any of the foregoing apparatus, further comprising: a website having a dashboard page; wherein each of the plurality of customized videos can be accessed through the dashboard page.

Supported embodiments include any of the foregoing apparatus, wherein the server sends each of the plurality of customized videos to a third party software system for distribution therefrom.

Supported embodiments include any of the foregoing apparatus, wherein the server includes a text-to-speech application programming interface for creating audio segments.

Supported embodiments include any of the foregoing apparatus, wherein the multimedia template creating computer system sends customized audio attributes to the text-to-speech application programming interface, the text-to-speech application programming interface converts the customized audio attributes into customized audio segments, and the text-to-speech application programming interface sends the customized audio segments to the media library, so that the customized audio segments can be incorporated into the plurality of customized videos.

Supported embodiments include any of the foregoing apparatus, wherein video rendering computer system includes at least one of an artificial intelligence application and a machine learning application for deconstructing the multimedia template into code and editing the code for conversion into the plurality of customized videos.

Supported embodiments include any of the foregoing apparatus, wherein the video rendering computer system is a rendering farm.

Supported embodiments include any of the foregoing apparatus, wherein the multimedia template creating computer system and the video rendering computer system reside on the computing device.

Supported embodiments include any of the foregoing apparatus, wherein the computing device is a first computing device and further comprising: a second computing device, wherein the multimedia template creating computer system and the video rendering computer system reside on the second computing device.

Supported embodiments include any of the foregoing apparatus, wherein the digital video production software application is a motion graphics creation software application.

Supported embodiments include any of the foregoing apparatus, wherein the server is a cloud server.

Supported embodiments include a computer-implemented method for distributing videos, the method comprising: accessing a multimedia library having a plurality of custom multimedia segments and a plurality of standard multimedia segments stored therein; receiving, from a cloud storage container residing on a server, a data model having a list of video recipients a multimedia template having a plurality of associated tags for each of the video recipients with each tag corresponding to one of the plurality of custom multimedia segments and the plurality of standard multimedia segments stored within the multimedia library; converting the multimedia template into a plurality of customized videos with each customized video having a unique identifier corresponding to one of the plurality of video recipients and each of the plurality of custom multimedia segments and each of the plurality of standard multimedia segments for the corresponding plurality of associated tags; and sending the plurality of customized videos to the server.

Supported embodiments include the foregoing computer-implemented method, further comprising: storing copies of the plurality of customized videos in an archive in memory.

Supported embodiments include any of the foregoing computer-implemented methods, further comprising: deconstructing the multimedia template into code; and editing the code with at least one of an artificial intelligence application and a machine learning application before the multimedia template is converted into the plurality of customized videos.

Supported embodiments include any of the foregoing computer-implemented methods, wherein the server is a cloud server.

Supported embodiments include a video distribution system comprising: a network; a multimedia template creating computing device; a media library computing device having a media library with a plurality of custom multimedia segments and a plurality of standard multimedia segments stored therein; a server connecting to the multimedia template creating computing device over the network and having a master database for holding a data model having a plurality of video recipients and a list of custom multimedia tags for each of the plurality of video recipients and a cloud storage container; and a video rendering computing device connecting to the server over the network and having memory for storing computer readable instructions, and a processor for executing the computer readable instructions, the computer readable instructions including instructions for: accessing the multimedia library; receiving the data model from the master database; converting the data model multimedia template into a plurality of customized videos with each customized video having a unique identifier corresponding to one of the plurality of video recipients and each of the plurality of custom multimedia segments and each of the plurality of standard multimedia segments for the corresponding plurality of associated tags; and sending the plurality of customized videos to the server over the network.

Supported embodiments include a device, a computer-readable storage medium, a computer program product and/or means for implementing any of the foregoing apparatus, methods, systems, or portions thereof.

Supported embodiments can provide various attendant and/or technical advantages in terms of a platform for creating bulk quantities of high-quality, personalized videos using variable text, video, photo, audio, and 3D components for thousands of users in just minutes or hours. Such advantages include the ability produce such videos through a process that would otherwise take hundreds or thousands of hours to complete.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. An apparatus for distributing videos comprising:
a multimedia template creating computer system having a digital video production software application residing thereon;
a media library residing on a computing device;
a server having a master database for holding a data model having a plurality of video recipients and a list of custom multimedia tags for each of the plurality of video recipients, a cloud storage container, and a non-linear editor for performing three-dimensional editing operations; and
a video rendering computer system having a media compression and encoding software application residing thereon;
wherein the server connects to the multimedia template creating computer system and the video rendering computer system over a network;
wherein a multimedia template is sent from the multimedia template creating computer system to the server over the network;
wherein the media compression and encoding software application accesses the media library and the master database to convert the multimedia template into a plurality of customized videos with each customized video having a unique identifier corresponding to one of the plurality of video recipients;

wherein the non-linear editor can perform an operation selected from the group consisting of rotating, skewing, transforming, modifying, or customizing text within each customized video, so that the text is placed on a sloped depiction of a surface within the customized video ;

wherein the media compression and encoding software application sends the plurality of customized videos to the server for storage in the cloud storage container; and wherein the server distributes each of the plurality of customized videos from the cloud storage container.

2. The apparatus of claim 1, wherein the server embeds a user interface having a form for receiving input from a user to create the data model.

3. The apparatus of claim 1, wherein the data model is stored in a spreadsheet that is transferred from the multimedia template creating computer system to the server.

4. The apparatus of claim 1, wherein the media library includes at least one of video segments, audio segments, graphics, text, fonts, video clips, audio, music, and geographic-based video segments for forming the plurality of customized videos.

5. The apparatus of claim 1, wherein the video rendering computer system includes an archive for storing copies of the plurality of customized videos thereon.

6. The apparatus of claim 1, wherein the video rendering computer system includes a watch folder.

7. The apparatus of claim 1, wherein each of the plurality of customized videos includes a unique hyperlink.

8. The apparatus of claim 7, further comprising:
a website having a dashboard page;
wherein each of the plurality of customized videos can be accessed through the dashboard page.

9. The apparatus of claim 1, wherein the server sends each of the plurality of customized videos to a third party software system for distribution therefrom.

10. The apparatus of claim 1, wherein the server includes a text-to-speech application programming interface for creating audio segments.

11. The apparatus of claim 10, wherein the multimedia template creating computer system sends customized audio attributes to the text-to-speech application programming interface, the text-to-speech application programming interface converts the customized audio attributes into customized audio segments, and the text-to-speech application programming interface sends the customized audio segments to the media library, so that the customized audio segments can be incorporated into the plurality of customized videos.

12. The apparatus of claim 1, wherein video rendering computer system includes at least one of an artificial intelligence application and a machine learning application for deconstructing the multimedia template into code and editing the code for conversion into the plurality of customized videos.

13. The apparatus of claim 1, wherein the video rendering computer system is a rendering farm; and wherein the digital video production software application is a motion graphics creation software application.

14. The apparatus of claim 1, wherein the multimedia template creating computer system and the video rendering computer system reside on the computing device.

15. The apparatus of claim 1, wherein the server is a cloud server with the computing device being a first computing device, the apparatus further comprising:
a second computing device, wherein the multimedia template creating computer system and the video rendering computer system reside on the second computing device.

16. The apparatus of claim 1, wherein the media compression and encoding software application converts at least one of the plurality of customized videos into at least one customized poster image with the at least one customized poster image having a unique identifier corresponding to one of the plurality of video recipients and at least one of the plurality of customized videos;

wherein the media compression and encoding software application sends the at least one customized poster image to the server for storage in the cloud storage container; and wherein the server distributes the at least one customized poster image from the cloud storage container.

17. A computer-implemented method for distributing videos, the method comprising:

accessing a multimedia library having a plurality of custom multimedia segments and a plurality of standard multimedia segments stored therein;

receiving, from a cloud storage container residing on a server, a data model having a list of video recipients and a multimedia template having a plurality of associated tags for each of the video recipients with each tag corresponding to one of the plurality of custom multimedia segments and the plurality of standard multimedia segments stored within the multimedia library;

converting the multimedia template into a plurality of customized videos with each customized video having a unique identifier corresponding to one of the plurality of video recipients and each of the plurality of custom multimedia segments and each of the plurality of standard multimedia segments for the corresponding plurality of associated tags;

performing, with a non-linear editor residing on the server, an operation selected from the group consisting of rotating, skewing, transforming, modifying, or customizing text within each customized video, so that the text is placed on a sloped depiction of a surface within the customized video; and sending the plurality of customized videos to the server.

18. The computer-implemented method of claim 17, wherein the server is a cloud server, the computer-implemented method further comprising:

deconstructing the multimedia template into code;
editing the code with at least one of an artificial intelligence application and a machine learning application before the multimedia template is converted into the plurality of customized videos; and storing copies of the plurality of customized videos in an archive in memory.

19. A video distribution system comprising:
a network;
a multimedia template creating computing device;
a media library computing device having a media library with a plurality of custom multimedia segments and a plurality of standard multimedia segments stored therein;

a server connecting to the multimedia template creating computing device over the network and having a master database for holding a data model having a plurality of video recipients and a list of custom multimedia tags for each of the plurality of video recipients, a cloud storage container, and a non-linear editor for performing three-dimensional editing operations; and a video rendering computing device connecting to the server over the network and having memory for storing computer readable instructions, and a processor for executing the computer readable instructions, the computer readable instructions including instructions for: 5
accessing the multimedia library;
receiving the data model and the multimedia template from the master database;
converting the data model and the multimedia template into a plurality of customized videos with each customized video having a unique identifier corresponding 10 to one of the plurality of video recipients and each of the plurality of custom multimedia segments and each of the plurality of standard multimedia segments for the corresponding plurality of associated tags; 15
performing, with the non-linear editor, an operation selected from the group consisting of rotating, skewing, transforming, modifying, or customizing text within each customized video, so that the text is placed on a sloped depiction of a surface within the customized 20 video; and
sending the plurality of customized videos to the server over the network.

\* \* \* \* \*